US009122479B2

(12) United States Patent
Kuo et al.

(10) Patent No.: US 9,122,479 B2
(45) Date of Patent: Sep. 1, 2015

(54) NETWORK PROCESSOR AND ENERGY SAVING METHOD THEREOF

(75) Inventors: Shieh-Hsing Kuo, Taipei Hsien (TW);
Ming-Je Li, Hsinchu Hsien (TW);
Shian-Ru Lin, Nan-Tou Hsien (TW);
Ting-Fa Yu, Yun-Lin Hsien (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 2233 days.

(21) Appl. No.: 12/060,356

(22) Filed: Apr. 1, 2008

(65) Prior Publication Data

US 2008/0250258 A1 Oct. 9, 2008

(30) Foreign Application Priority Data

Apr. 3, 2007 (TW) ................................ 96111846 A

(51) Int. Cl.
*G06F 1/32* (2006.01)
(52) U.S. Cl.
CPC ............ *G06F 1/3237* (2013.01); *G06F 1/3209* (2013.01); *Y02B 60/1221* (2013.01)
(58) Field of Classification Search
USPC .................................. 713/300, 320, 322, 324
See application file for complete search history.

(56) References Cited

U.S. PATENT DOCUMENTS

| | | | |
|---|---|---|---|
| 5,991,885 A * | 11/1999 | Chang et al. .................. 713/300 |
| 6,134,665 A * | 10/2000 | Klein et al. .................... 713/300 |
| 6,272,628 B1 | 8/2001 | Aguilar et al. |
| 6,546,496 B1 | 4/2003 | Wang et al. |
| 6,618,814 B1 * | 9/2003 | Gaur et al. ..................... 713/323 |
| 6,678,831 B1 | 1/2004 | Mustafa et al. |
| 6,778,620 B1 | 8/2004 | Lindberg et al. |
| 6,993,667 B1 | 1/2006 | Lo |
| 7,454,634 B1 * | 11/2008 | Donovan et al. .............. 713/322 |
| 2002/0019954 A1 * | 2/2002 | Tran ............................... 713/600 |
| 2003/0088796 A1 * | 5/2003 | Abdulkarim .................. 713/300 |
| 2005/0026581 A1 * | 2/2005 | Wood ............................ 455/219 |
| 2005/0097378 A1 * | 5/2005 | Hwang ......................... 713/320 |
| 2007/0104124 A1 * | 5/2007 | Lee et al. ...................... 370/311 |
| 2007/0106920 A1 * | 5/2007 | Lee et al. ...................... 713/320 |

* cited by examiner

*Primary Examiner* — Kim Huynh
*Assistant Examiner* — Brandon Kinsey
(74) *Attorney, Agent, or Firm* — McClure, Qualey & Rodack, LLP

(57) ABSTRACT

A network processor includes a transceiver circuit, a network data processing unit, and a clock signal control unit. The transceiver circuit transmits and receives a network signal, compares a voltage level of the network signal with a threshold value, outputs a comparison result, and operates under a first clock signal. The network data processing unit is coupled to the transceiver circuit to process the network signal, and operates under a second clock signal different from the first clock signal. The clock signal control unit disables supply of the second clock signal to the network data processing unit when the voltage level is smaller than the threshold value, and enables supply of the second clock signal to the network data processing unit when the voltage level is not smaller than the threshold value. An energy saving method for a network processor is also disclosed.

20 Claims, 4 Drawing Sheets

NETWORK PROCESSOR AND ENERGY SAVING METHOD THEREOF

CROSS-REFERENCE TO RELATED APPLICATION

This application claims priority of Taiwanese application no. 096111846, filed on Apr. 3, 2007.

BACKGROUND OF THE INVENTION

1. Field of the Invention

The invention relates to a processor and an energy saving method thereof, more particularly to a network processor and an energy saving method thereof.

2. Description of the Related Art

Many electronic devices, such as computers, storage media, printers, etc., are usually interconnected to form a network for conducting data exchange. Each network device establishes and maintains connections with other network devices through a network processor and a plurality of cables. For a network device that uses batteries as a source of power, battery power is rapidly exhausted when the network processor continuous to consume power even if there is no connection with other network devices. On the other hand, for a network device that does not use batteries as a power source, reducing energy consumption of the network processor can reduce the amount of heat dissipated thereby.

FIG. 1 illustrates a conventional network device disclosed in U.S. Pat. No. 6,993,667. The network device includes a physical layer 2. The physical layer 2 includes a physical layer circuit 21, an energy saving circuit 22, a receiver 23 and a transmitter 24. The physical layer 2 is operable between first and second energy saving modes.

Under the first energy saving mode, when the receiver 23 detects a connection activity, the energy saving circuit 22 powers up the physical layer 2 so as to establish and maintain connections with other network devices (not shown). Otherwise, the energy saving circuit 22 powers down components of the physical layer 2 other than the energy saving circuit 22 and the receiver 23.

Under the second energy saving mode, the energy saving circuit 22 periodically powers the transmitter 24 to generate a link pulse.

In this manner, the physical layer 2 is able to determine automatically whether energy consumption is to be saved based on the connection activity.

However, since the energy saving method involves shutting down power for the network device, a complicated energy saving circuit 22 is required to be designed to control switching between the energy saving modes. Moreover, a relatively long period is required to restore supply of power when powering up.

FIG. 2 illustrates another conventional network device that includes a RJ45 connection port 11, a network processor 12, and a south bridge 13. The RJ45 connection port 11 is able to detect plugging and unplugging activities of a cable (not shown) and to send a status signal to the south bridge 13. Based on the status signal, the south bridge 13 powers off the network processor 12 when the cable is unplugged from the RJ45 connection port 11, and powers on the network processor 12 when the cable is plugged into the RJ45 connection port 11. Energy consumption of the network processor 12 is saved accordingly.

However, the network device of FIG. 2 requires a specially designed RJ45 connection port 11 capable of detecting plugging and unplugging activities of a cable, which results in higher costs.

SUMMARY OF THE INVENTION

Therefore, the main object of the present invention is to provide a network processor capable of disabling supply of clock signals to save energy consumption.

Another object the present invention is to provide an energy saving method for a network processor, which determines whether supply of a clock signal is to be disabled based on a voltage level received by the network processor, thereby reducing energy consumption of the network processor.

According to one aspect of the present invention, there is provided a network processor that includes a transceiver circuit, a network data processing unit, and a clock signal control unit.

The transceiver circuit transmits and receives a network signal, compares a voltage level of the network signal with a threshold value, outputs a comparison result, and operates under a first clock signal.

The network data processing unit is coupled to the transceiver circuit, is operable to process the network signal received by the transceiver circuit, and operates under a second clock signal having a frequency different from that of the first clock signal.

The clock signal control unit is coupled to the transceiver circuit and the network data processing unit, and controls the second clock signal according to the comparison result. In particular, the clock signal control unit disables supply of the second clock signal to the network data processing unit when the voltage level is smaller than the threshold value, and enables supply of the second clock signal to the network data processing unit when the voltage level is not smaller than the threshold value.

According to another aspect of the present invention, there is provided an energy saving method for a network processor. The energy saving method comprises the steps of:

a) receiving a network signal through a receiver circuit;

b) comparing a voltage level of the network signal with a threshold value, and outputting a comparison result; and c) controlling a clock signal for a network data processing unit according to the comparison result.

Supply of the clock signal to the network data processing unit is disabled when the voltage level is smaller than the threshold value, and is enabled when the voltage level is not smaller than the threshold value.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
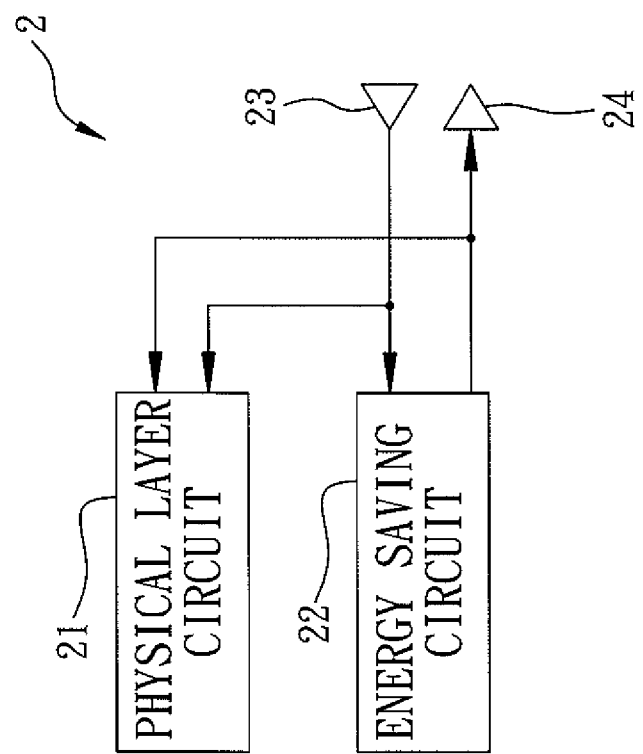
FIG. 1 is a block diagram of a conventional network device.
Figure 2:
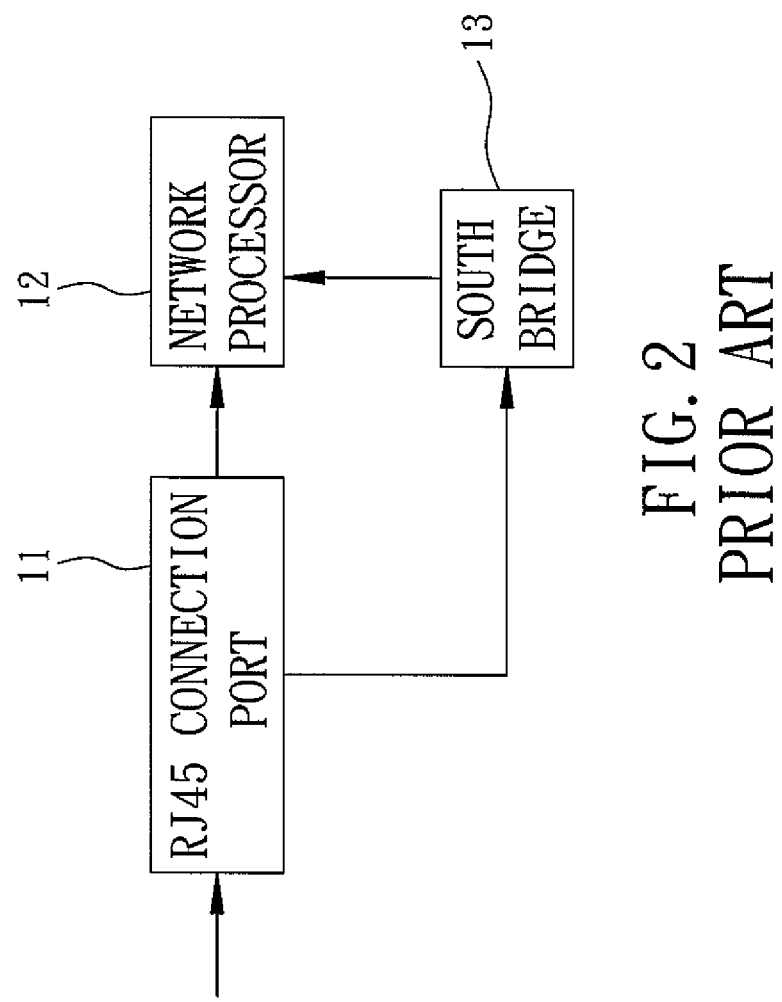
FIG. 2 is a block diagram of another conventional network device.

Before the present invention is described in greater detail with reference to the accompanying preferred embodiments, it should be noted herein that like elements are denoted by the same reference numerals throughout the disclosure.

Figure 3:
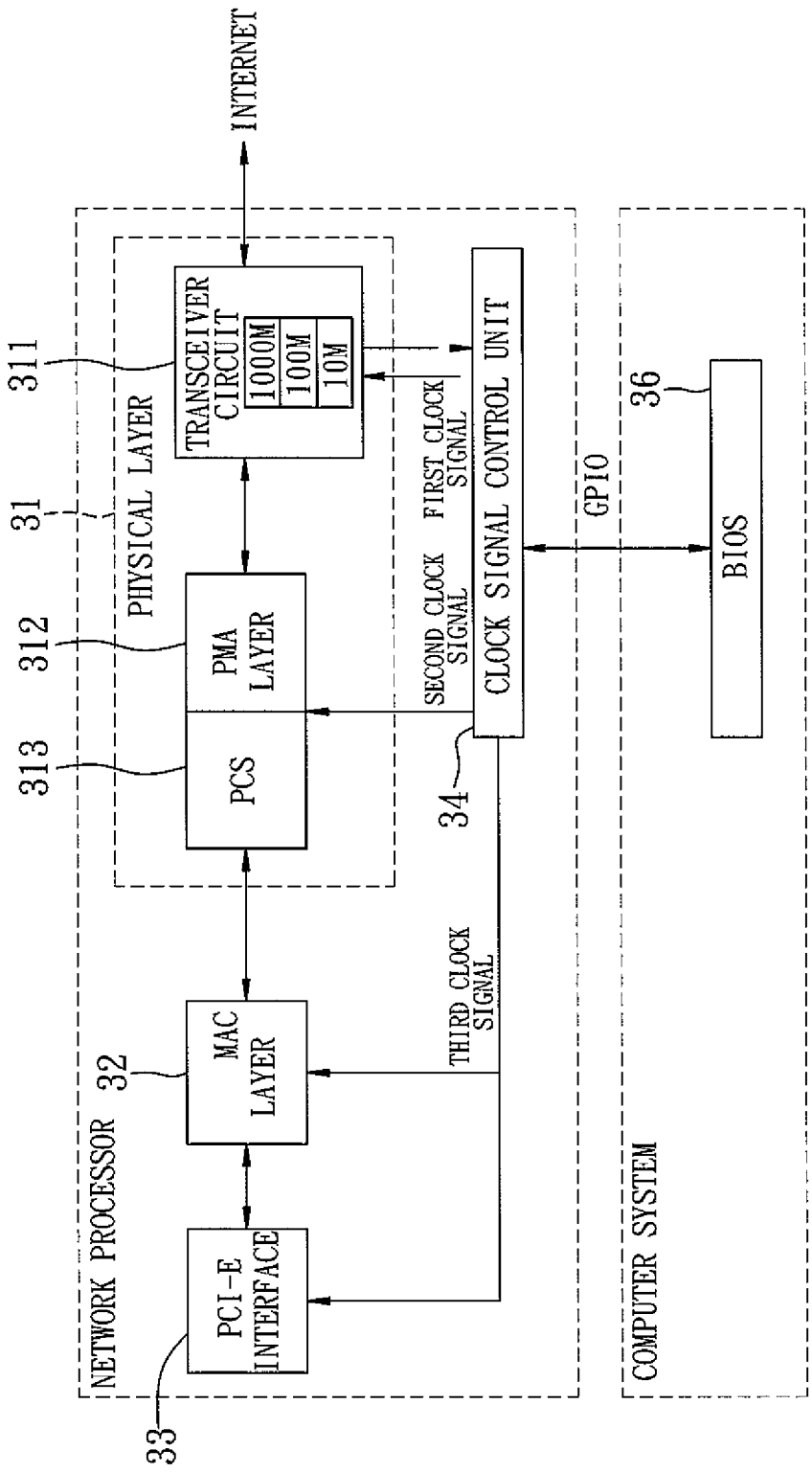
FIG. 3 is a block diagram of the first and second preferred embodiments of a network processor according to the present invention.

Referring to FIG. 3, the first preferred embodiment of a network processor according to the present invention is shown to be embodied in an Ethernet network processor applied in a cable network, and includes a physical layer 31, a media access control (MAC) layer 32, a peripheral component interconnect-express (PCI-E) interface 33, and a clock signal control unit 34. The physical layer 31 includes a transceiver circuit 311, a physical media attachment (PMA) layer 312, and a physical coding sub-layer (PCS) 313. The transceiver circuit 311 belongs to analog circuit, whereas the physical media attachment (PMA) layer 312 and the physical coding sub-layer (PCS) 313 belong to digital circuit. The transceiver circuit 311 operates under a first clock signal, the PMA layer 312 and the PCS 313 operate under a second clock signal, and the MAC layer 32 and the PCI-E interface 33 operate under a third clock signal. The first, second and third clock signals have different frequencies. In general, the second clock signal has a frequency higher than that of the first clock signal.

In the first preferred embodiment of the present invention, the transceiver circuit 311 includes a comparator (not shown) for receiving a network data signal, which is a differential signal. The comparator compares a differential mode voltage of the network data signal with a predetermined threshold voltage, and outputs a comparison result to the clock signal control unit 34. In this embodiment, when the differential mode voltage of the network data signal is smaller than the threshold voltage, the transceiver circuit 311 generates a first logic value as the comparison result for subsequent output to the clock signal control unit 34. Then, if the first logic value is maintained for a period exceeding a predetermined time period (which indicates that no link pulse was inputted to the transceiver circuit 311), the clock signal control unit 34 disables supply of the second and third clock signals to enter an energy-saving mode, and sends a command signal to a basic input/output system (BIOS) 36 of a computer system. On the other hand, when the differential mode voltage of the network data signal is not smaller than the threshold voltage, the transceiver circuit 311 generates a second logic value as the comparison result for subsequent output to the clock signal control unit 34. At this time, the clock signal control unit 34 sends another command signal to the BIOS 36 so as to enable the BIOS 36 to send a feedback signal to the clock signal control unit 34. In response to the feedback signal, the clock signal control unit 34 enables supply of the second and third clock signals so as to restore operation of the network processor.

In this embodiment, different components operate under different clock signals. Therefore, when no connection activity is detected, only those components that are required to operate can receive the corresponding clock signal, and those components that are not required to operate will have their supply of the corresponding clock signals disabled. For instance, the transceiver circuit 311 that operates under the first clock signal is required to operate in the energy-saving mode, while supply of the second clock signal used by the PMA layer 312 and the PCS 313 and/or the third clock signal used by the MAC layer 32 and the PCI-E 33 can be disabled in the energy-saving mode to save energy consumption.

In this embodiment, the clock signal control unit 34 sends the command signal to the BIOS 36 through a general purpose input/output (GPIO), but should not be limited thereto.

In one implementation of the preferred embodiment of this invention, the clock signal control unit 34 includes a phase-locked loop (PLL) (not shown) and an associated logic control circuit (not shown). When the transceiver circuit 311 does not receive link pulses, the logic control circuit can turn off the phase-locked loop so as to disable supply of the second and third clock signals and save energy consumption. In another implementation of the preferred embodiment of this invention, the clock control circuit 34 includes a clock gating circuit (not shown) and an associated logic control circuit (not shown). When the transceiver circuit 311 does not receive link pulses, the clock gating circuit can disable supply of the second and third clock signals to save energy consumption. However, implementation of the clock signal control unit 34 should not be limited to the use of the phase-locked loop and the clock gating circuit.

In addition, the network processor of the present invention should not be limited to the Ethernet network processor, and can be other types of network processors. Furthermore, this invention should not be limited to the PCI-E interface 33 since other interfaces, such as the peripheral component interconnect (PCI) interface, are also suitable for use in the invention.

In the second preferred embodiment of the network processor according to the present invention, a south bridge (not shown) communicates with the PCI-E interface 33 to drive the PCI-E interface 33 and the MAC layer 32 to enter the L2 energy-saving mode. That is, when the transceiver circuit 311 does not receive link pulses, the clock signal control unit 34 disables supply of the second clock signal and notifies the BIOS 36 that the physical layer 31 has already entered the energy-saving mode. The BIOS 36 then notifies the south bridge, which communicates with the PCI-E interface 33 to drive the PCI-E interface 33 and the MAC layer 32 to enter the L2 energy-saving mode. Since the L2 energy-saving mode is well known to those skilled in the art, further details of the same will be omitted herein for the sake of brevity.

In this embodiment, the clock signal control unit 34 communicates with the BIOS 36 through the GPIO. However, the clock signal control unit 34 may communicate with the BIOS 36 through the PCI-E interface 33 in other embodiments of the invention.

Figure 4:
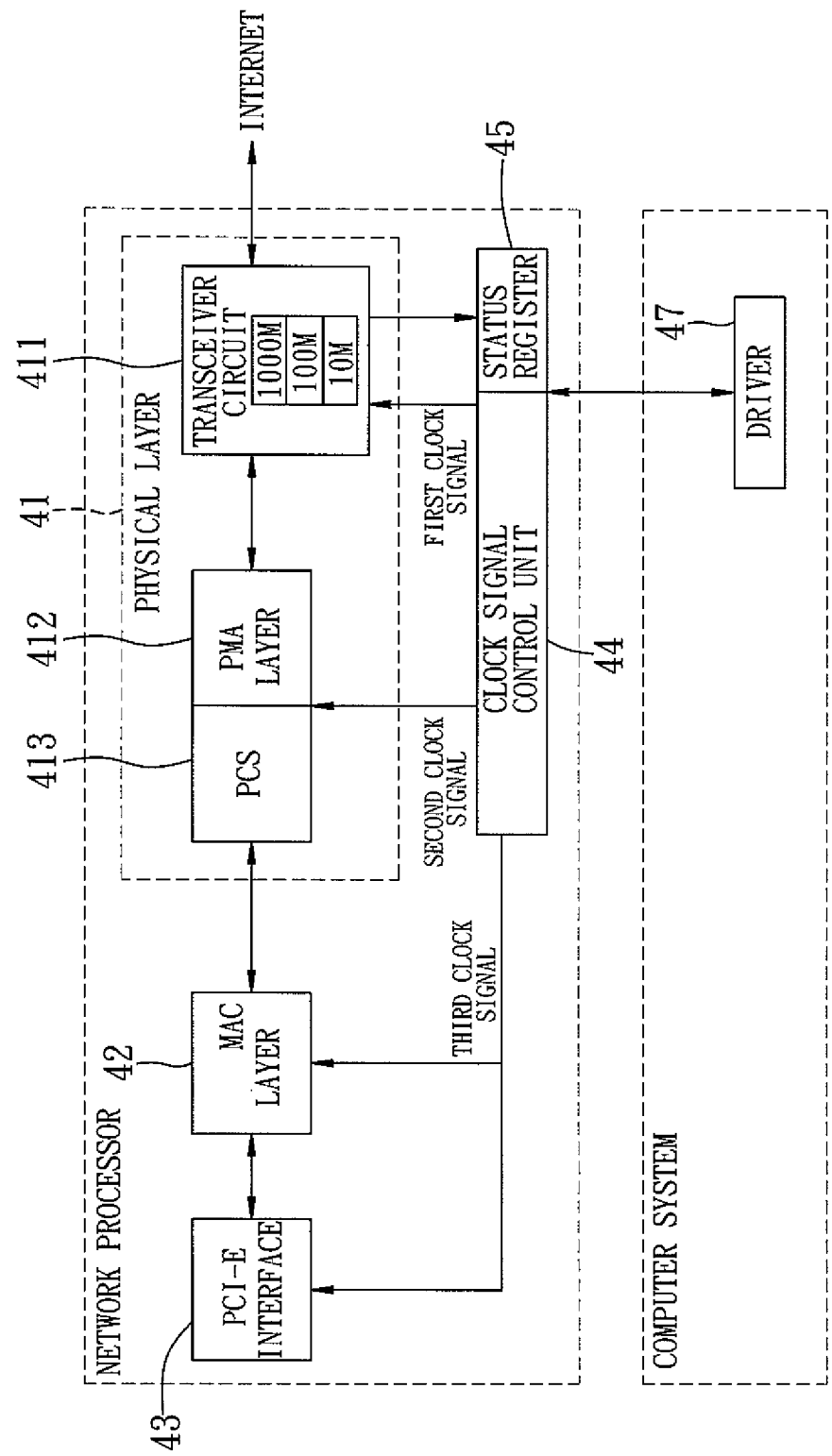
FIG. 4 is a block diagram of the third preferred embodiment of a network processor according to the present invention.

Referring to FIG. 4, the third preferred embodiment of the network processor according to the present invention differs from the previous embodiments in that the network processor further includes a status register 45 and a driver 47 for causing a computer system to control the energy-saving mode of the network processor.

First, the transceiver circuit 411 compares the differential mode voltage of the network data signal received thereby with a predetermined threshold voltage to determine whether a link pulse was received, and stores the comparison result in the status register 45. Through the driver 47 of the computer system, the status register 45 is polled periodically to inspect the logic value stored therein. If the logic value indicates that no link pulse was received, the clock signal control unit 44 disables supply of the second clock signal, and a south bridge (not shown) is notified through the driver 47. The south bridge then communicates with the PCI-E interface 43 so as to drive the PCI-E interface 43 and the MAC layer 42 to enter the L2 energy-saving mode. On the other hand, if the polled logic value indicates that a link pulse was received, the clock signal control unit 44 enables supply of the second clock signal, and drives the PCI-E interface 43 and the MAC layer 42 to exit the L2 energy-saving mode.

In the preferred embodiments of the present invention, the inherent connectivity detection function of the transceiver circuit is utilized to determine whether the supply of the second and/or third clock signals is to be disabled, or whether the PCI-E interface and the MAC layer are to enter the L2 energy-saving mode so as to save energy consumption. Since this invention does not require a specially designed RJ45 connection port for detecting cable plugging and unplugging activities, higher costs can be avoided.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A network processor comprising:
   a transceiver circuit for transmitting and receiving a network signal, for comparing a voltage level of the network signal with a threshold value, and for outputting a comparison result, wherein said transceiver circuit continuously operates under a first clock signal;
   a network data processing unit coupled to said transceiver circuit and operable to process the network signal received by said transceiver circuit, wherein said network data processing unit operates under a second clock signal, the second clock signal having a frequency different from that of the first clock signal; and
   a clock signal control unit coupled to said transceiver circuit and said network data processing unit, and controlling the second clock signal according to the comparison result;
   wherein said clock signal control unit disables supply of the second clock signal to said network data processing unit when the voltage level is smaller than the threshold value, and enables supply of the second clock signal to said network data processing unit when the voltage level is not smaller than the threshold value.

2. The network processor as claimed in claim 1, wherein said clock signal control unit disables supply of the second clock signal to said network data processing unit when the voltage level is smaller than the threshold value for a predetermined time period.

3. The network processor as claimed in claim 1, wherein the frequency of the second clock signal is higher than that of the first clock signal.

4. The network processor as claimed in claim 1, wherein said network data processing unit includes a physical media attachment (PMA) layer.

5. The network processor as claimed in claim 1, wherein said network data processing unit includes a media access control (MAC) layer.

6. The network processor as claimed in claim 1, further comprising:
   a register coupled to said transceiver circuit for storing a status signal that is set to a first logic value when the voltage level is smaller than the threshold value, and that is set to a second logic value when the voltage level is not smaller than the threshold value.

7. The network processor as claimed in claim 1, which is adapted for connection to a computer system that includes a basic input/output system (BIOS), wherein said network processor is adapted to send a command signal to the BIOS when the voltage level is smaller than the threshold value for causing the BIOS to output a control signal to said clock signal control unit for disabling supply of the second clock signal to said network data processing unit.

8. The network processor as claimed in claim 7, wherein the command signal is sent to the BIOS through a general purpose input/output (GPIO).

9. The network processor as claimed in claim 1, wherein said clock signal control unit includes a clock gating circuit.

10. The network processor as claimed in claim 1, wherein said clock signal control unit includes a phase-locked loop.

11. The network processor as claimed in claim 1, wherein the network signal is a differential signal, and the voltage level is a differential mode voltage of the differential signal.

12. An energy saving method for a network processor, comprising the steps of:
   a) receiving a network signal through a receiver circuit, wherein the receiver circuit continuously operates under a first clock signal;
   b) comparing a voltage level of the network signal with a threshold value, and outputting a comparison result; and
   c) controlling a second clock signal for a network data processing unit according to the comparison result;
   wherein supply of the second clock signal to the network data processing unit is disabled when the voltage level is smaller than the threshold value, and is enabled when the voltage level is not smaller than the threshold value.

13. The energy saving method as claimed in claim 12, wherein, in step c), supply of the second clock signal to the network data processing unit is disabled when the voltage level is smaller than the threshold value for a predetermined time period.

14. The energy saving method as claimed in claim 12, further comprising:
   sending a command signal to a basic input/output system when the voltage level is smaller than the threshold value.

15. The energy saving method as claimed in claim 12, further comprising:
   storing the comparison result in a register; and
   polling the register to determine whether supply of the second clock signal to the network data processing unit is to be disabled.

16. The energy saving method as claimed in claim 12, wherein the network signal is a differential signal, and the voltage level is a differential mode voltage of the differential signal.

17. The energy saving method as claimed in claim 12, wherein supply of the second clock signal is disabled by turning off a phase-locked loop.

18. The energy saving method as claimed in claim 12, wherein supply of the second clock signal is disabled through a clock gating circuit.

19. The energy saving method as claimed in claim 12, wherein the network data processing unit includes a physical media attachment (PMA) layer.

20. The energy saving method as claimed in claim 12, wherein the network data processing unit includes a media access control (MAC) layer.

* * * * *